United States Patent
Edwards (10) Patent No.: US 8,033,221 B2
(45) Date of Patent: Oct. 11, 2011

(54) SYSTEM AND METHOD FOR SENSING PROXIMITY (75) Inventor: Jeffrey C. Edwards, Tucson, AZ (US)

(73) Assignee: Raytheon Company, Waltham, MA (US)

(*) Notice: Subject to any disclaimer, the term of this patent is extended or adjusted under 35 U.S.C. 154(b) by 1093 days.

(21) Appl. No.: 11/891,909

(22) Filed: Aug. 13, 2007

(65) Prior Publication Data
US 2010/0328642 A1 Dec. 30, 2010

(51) Int. Cl.
*F42C 13/02* (2006.01)
(52) U.S. Cl. .................... 102/213; 244/3.16
(58) Field of Classification Search .................. 102/213, 102/206, 211, 215; 244/3.15, 3.16
See application file for complete search history.

(56) References Cited

U.S. PATENT DOCUMENTS

| | | | | |
|---|---|---|---|---|
| 3,946,674 A * | 3/1976 | Pettersson et al. | ............ | 102/207 |
| 4,022,132 A * | 5/1977 | Blomqvist et al. | ............ | 102/213 |
| 4,556,313 A * | 12/1985 | Miller et al. | ................. | 356/4.07 |
| 4,776,274 A * | 10/1988 | Kriz et al. | ...................... | 102/213 |
| 4,848,239 A * | 7/1989 | Wilhelm | ........................ | 102/492 |
| 4,936,216 A * | 6/1990 | Skagerlund | .................... | 102/213 |
| 4,987,832 A * | 1/1991 | Klink et al. | ..................... | 102/213 |
| 5,601,024 A * | 2/1997 | Sepp et al. | ...................... | 102/213 |
| 5,696,347 A * | 12/1997 | Sebeny et al. | ................. | 102/214 |

* cited by examiner

*Primary Examiner* — James Bergin
(74) *Attorney, Agent, or Firm* — Schwegman, Lundberg & Woessner, P.A.; Gregory J. Gorrie (57) ABSTRACT

A system for detecting proximity to a target object. The novel system includes a detector adapted to receive a reflected electromagnetic beam from the target and a processor adapted to determine a distance to the target by measuring an angle of the reflected beam. The system may also include an emitter adapted to transmit an electromagnetic beam toward the target to produce the reflected beam such that the angle of the reflected beam corresponds with a distance to the target. In an illustrative embodiment, the emitter is a focused infrared emitter or laser diode positioned to transmit the beam at a known angle such that the transmitted beam crosses an optical axis of the detector. The processor may also be adapted to use the rate of change of the amplitude of the reflected beam in determining the distance to the target.

15 Claims, 7 Drawing Sheets

The Electronics blank a Type B pulse if it would interfere with receiving a Type A pulse Pulse Absolute Amplitude and Rate of Increase Thresholds

SYSTEM AND METHOD FOR SENSING PROXIMITY

BACKGROUND OF THE INVENTION

1. Field of the Invention

The present invention relates to optical and electrical systems. More specifically, the present invention relates to systems and methods for sensing proximity to a target object.

2. Description of the Related Art

Missiles often require detonation of a warhead to occur a short distance before impacting the target for maximum warhead effectiveness. Particularly when a shaped charge warhead must penetrate an armored target, the ability to control standoff distance for warhead jet formation greatly impacts the probability of kill.

Fuzes for low cost weapons have traditionally detonated warheads upon target impact using crush switches. Other fuzes have also been deployed that sense altitude or target proximity for detonation. Proximity sensing fuzes typically operate by transmitting an RF (radio frequency) or optical signal toward the target and measuring the time until a reflected return signal is received to determine the distance to the target. The warhead is then detonated when the missile is at a predetermined distance away from the target.

Conventional proximity sensing fuzes typically require additional electronics for transmitting, receiving, and processing the RF or optical signal. These electronics usually serve no purpose other than proximity sensing and add a higher cost to the missile. In addition, conventional proximity sensing fuzes typically have lower precision at sensing the distance to a target located directly in front of the weapon.

Hence, a need exists in the art for an improved system or method for sensing proximity that is less expensive and more accurate than prior approaches.

SUMMARY OF THE INVENTION

The need in the art is addressed by the system for detecting proximity to a target object of the present invention. The novel system includes a detector adapted to receive a reflected electromagnetic beam from the target and a processor adapted to determine a distance to the target by measuring an angle of the reflected beam. The system may also include an emitter adapted to transmit an electromagnetic beam toward the target to produce the reflected beam such that the angle of the reflected beam corresponds with a distance to the target. In an illustrative embodiment, the emitter is a focused infrared emitter or laser diode positioned to transmit the beam at a known angle such that the transmitted beam crosses an optical axis of the detector. The processor may also be adapted to use the rate of change of the amplitude of the reflected beam in determining the distance to the target.

BRIEF DESCRIPTION OF THE DRAWINGS

FIG. 3b is a diagram of a missile with a proximity sensing semi-active laser seeker designed in accordance with an illustrative embodiment of the present teachings, when the missile is at a second distance away from the target, closer to the target than in FIG. 3a.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention teaches a novel system and method for sensing proximity that is particularly suitable for a missile having a semi-active laser (SAL) seeker. A SAL seeker is set up to very precisely measure the angle to a laser spot placed on a target. The missile guidance system can then use this angle to guide the missile to the target. The present invention leverages the angle measuring capability of a SAL seeker to allow it to perform an additional proximity sensing function at minimal incremental cost.

Figure 1:
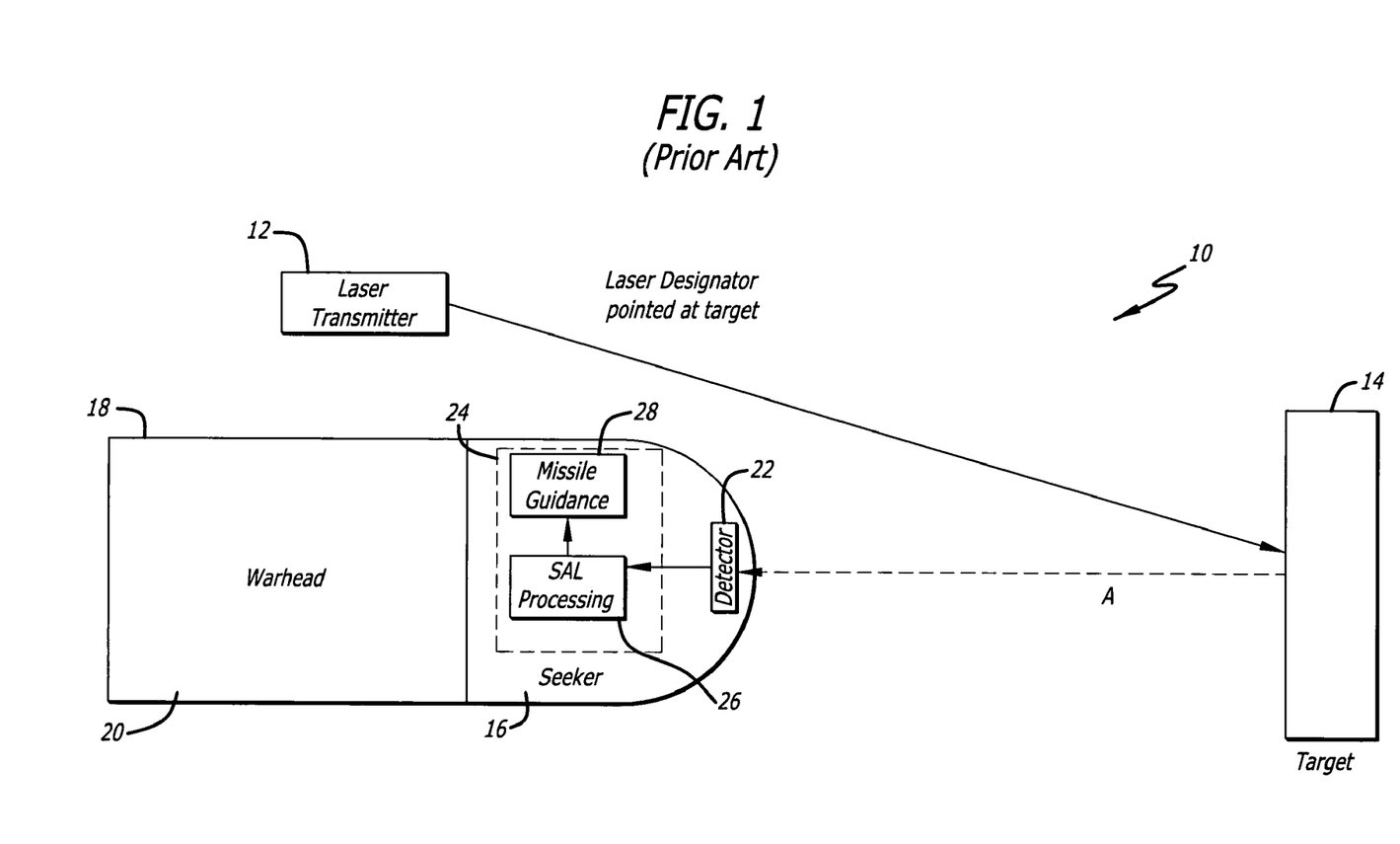
FIG. 1 is a simplified diagram of a typical semi-active laser system.

FIG. 1 is a simplified diagram of a typical SAL system 10. A laser designator 12 is pointed at a target 14 with a modulated laser beam, forming a laser spot on the target 14. A SAL seeker 16 on a missile 18 senses the laser signal reflected from the target 14 and guides the missile 18 toward the laser spot on the target 14. In a SAL system, the laser designator 12 is external to the missile 18, usually held by a person on the ground or located onboard an aircraft. The missile warhead 20 is usually configured to detonate upon impact.

The SAL seeker 16 includes a detector 22 and electronics 24. The detector 22 is typically a four-detector array adapted to sense the reflected laser signal from the target 14. The SAL electronics 24 include a processor 26 that takes the detected signals from the detector array 22 and measures the angle between the location of the laser spot and the missile heading. The angle is typically measured by using the amplitude relationship between the multiple laser sensors in the detector array 22. A missile guidance system 28 then uses the angle measurement to guide the missile 18 toward the target 14.

In accordance with the teachings of the present invention, a low-cost proximity sensing fuze can be added to the missile by utilizing the optics and electronics already existing in a SAL seeker. Most conventional proximity sensing devices use the timing of a reflected energy pulse to measure distance. The present invention uses the relative amplitude of reflected light from a target incident upon several detector elements to calculate angle of incidence. A tightly focused or coherent light source is directed to allow the angle of reflection to be used for distance measurement. A distinct modulation of that light can be applied to distinguish it from the laser designator normally tracked by a SAL seeker.

Figure 2:
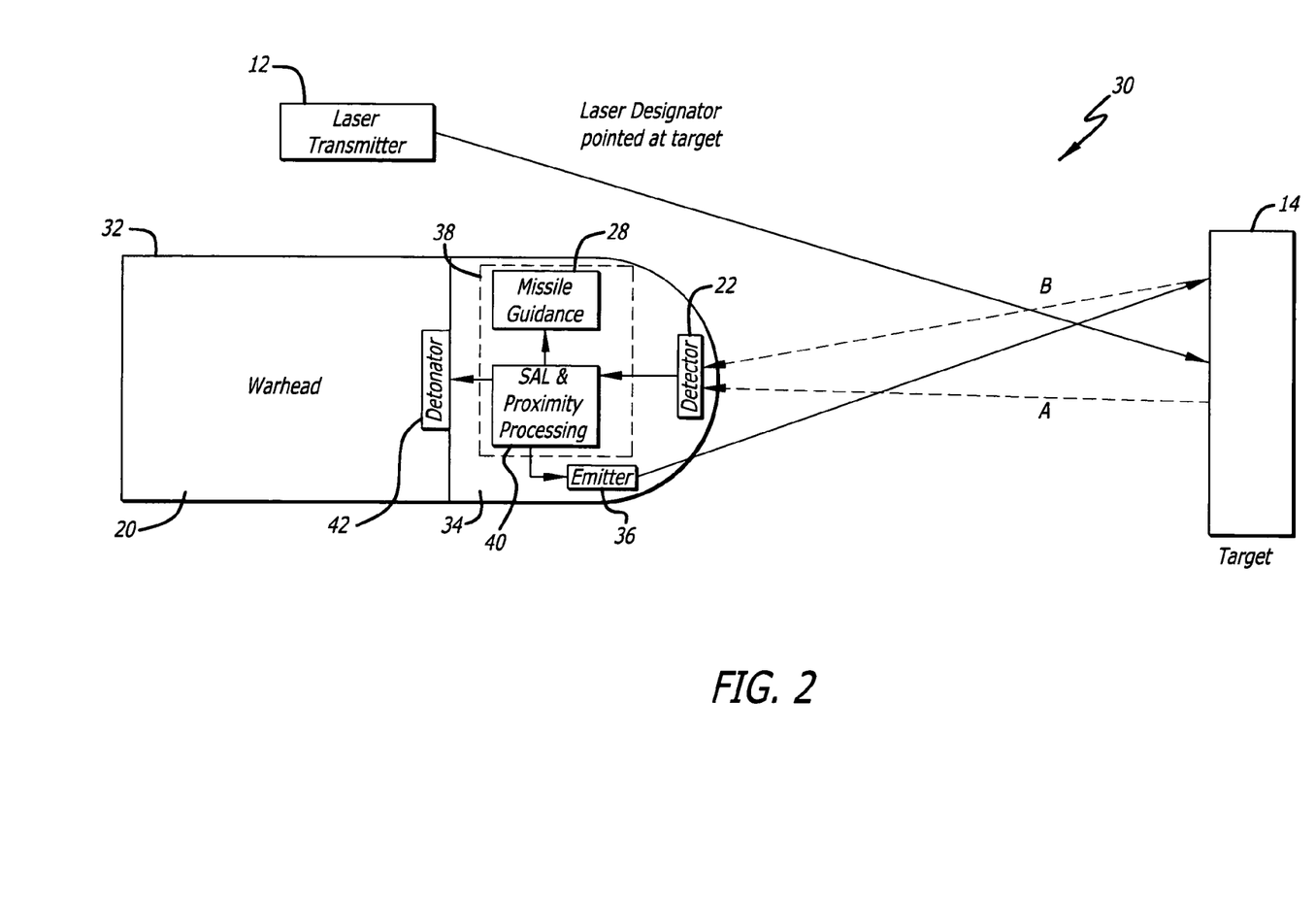
FIG. 2 is a simplified diagram of a semi-active laser system with a proximity sensing fuze designed in accordance with an illustrative embodiment of the present invention.

FIG. 2 is a simplified diagram of a SAL system 30 with a proximity sensing fuze designed in accordance with an illustrative embodiment of the present invention. An external laser designator 12 is pointed at a target 14 with a modulated laser beam, forming a laser spot on the target 14. A missile 32 equipped with a novel SAL seeker 34 with proximity sensing capability detects the laser signal reflected from the target 14 and guides the missile 34 toward the laser spot on the target 14.

The SAL seeker 34 includes a detector 22 and electronics 38. The detector 22 is adapted to sense the reflected laser signal (labeled "A") from the target 14. The detector 22 may be a four detector array as is common in SAL systems, or it may be a larger or smaller array, or it may be a single detector, possibly with a scanning mechanism. The SAL electronics 38 include a processor or processing system 40 that takes the detected signals from the detector array 22 and measures the angle error between the location of the laser spot and the missile heading. Methods for measuring the angle are well known in the art. For example, the angle may be measured based on the received amplitude relationship between the multiple detector elements in the detector array 22. A missile guidance system 28 then uses the angle measurement to guide the missile 32 toward the target 14.

In accordance with the teachings of the present invention, the seeker 34 also includes an electromagnetic emitter 36 used for proximity sensing. The emitter 36 transmits a narrow beam of electromagnetic energy, such as a focused infrared (IR) or other laser beam, such that the distance to the target 14 can be determined by measuring the angle of the reflected emitter return signal (labeled "B"). In the illustrative embodiment, the emitter 36 is angled such that the transmitted beam crosses the missile boresight (i.e., the optical axis of the detector 22). The emitter beam reflects off of the target 14 and the reflected emitter signal B is detected by the SAL detector 22 (in addition to the laser designator signal A). The SAL processor 40 measures the angle of the reflected emitter signal B, preferably using the same algorithm used to measure the angle of the reflected laser designator signal A. When the measured angle of the reflected emitter signal B crosses a predetermined threshold corresponding to a desired distance to the target 14, the processor 40 generates a control signal to a detonator 42, instructing it to detonate the warhead 20. In the illustrative embodiment, the processor 40 is also configured to drive the emitter 36 with a unique modulation so that the emitter signal B can be distinguished from the external designator signal A.

Figure 3A:
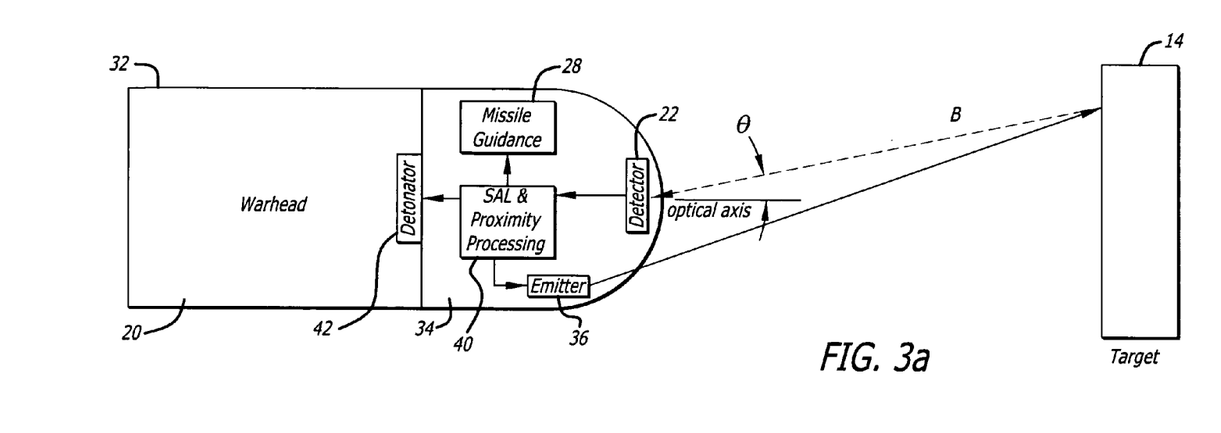
FIG. 3a is a diagram of a missile with a proximity sensing semi-active laser seeker designed in accordance with an illustrative embodiment of the present teachings, when the missile is at a first distance away from the target.
Figure 3B:
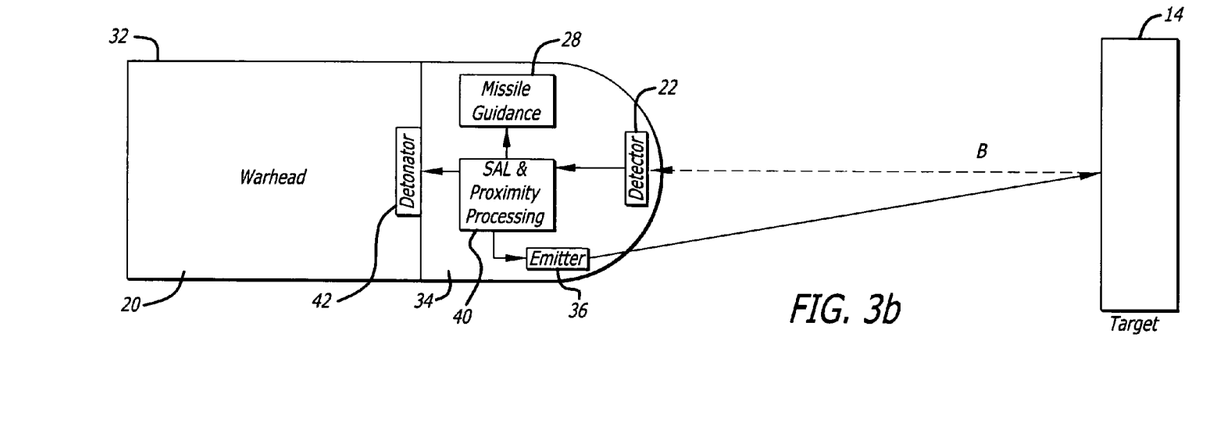

FIGS. 3a and 3b illustrate how the angle of reflection of the emitter signal B corresponds with proximity to the target 14. FIG. 3a is a diagram of a missile 32 with a proximity sensing SAL seeker 34 designed in accordance with an illustrative embodiment of the present teachings, when the missile 32 is at a first distance away from the target 14. FIG. 3b is a diagram showing the missile 32 at a second distance away from the target 14, closer to the target 14 than in FIG. 3a.

The emitter 36 transmits an emitter signal that is fixed at a known angle relative to the missile 32. The emitter signal strikes the target 14 at a different spot depending on the distance to the target 14, and is reflected back toward the missile 32. As shown in FIG. 3a, the reflected emitter signal B received by the SAL detector 22 has an angle θ relative to the optical axis of the detector 22. As the missile 32 moves toward the target, the angle of primary reflection θ changes with proximity to the target 14 and can be calculated using basic principles of trigonometry. In FIG. 3a, the angle θ is approximately equal to 10°, and in FIG. 3b when the missile 32 is closer to the target 14, the angle θ is approximately equal to 0°. The SAL processor 40 is programmed to trigger detonation when the reflection angle θ corresponds to the desired detonation distance. In a preferred embodiment, the system 30 is set up to trigger detonation when the reflection angle θ is equal to 0° for maximum linearity. This can be accomplished by properly placing the emitter 36 such that a reflection angle θ=0° corresponds with the desired detonation distance.

Figure 4:
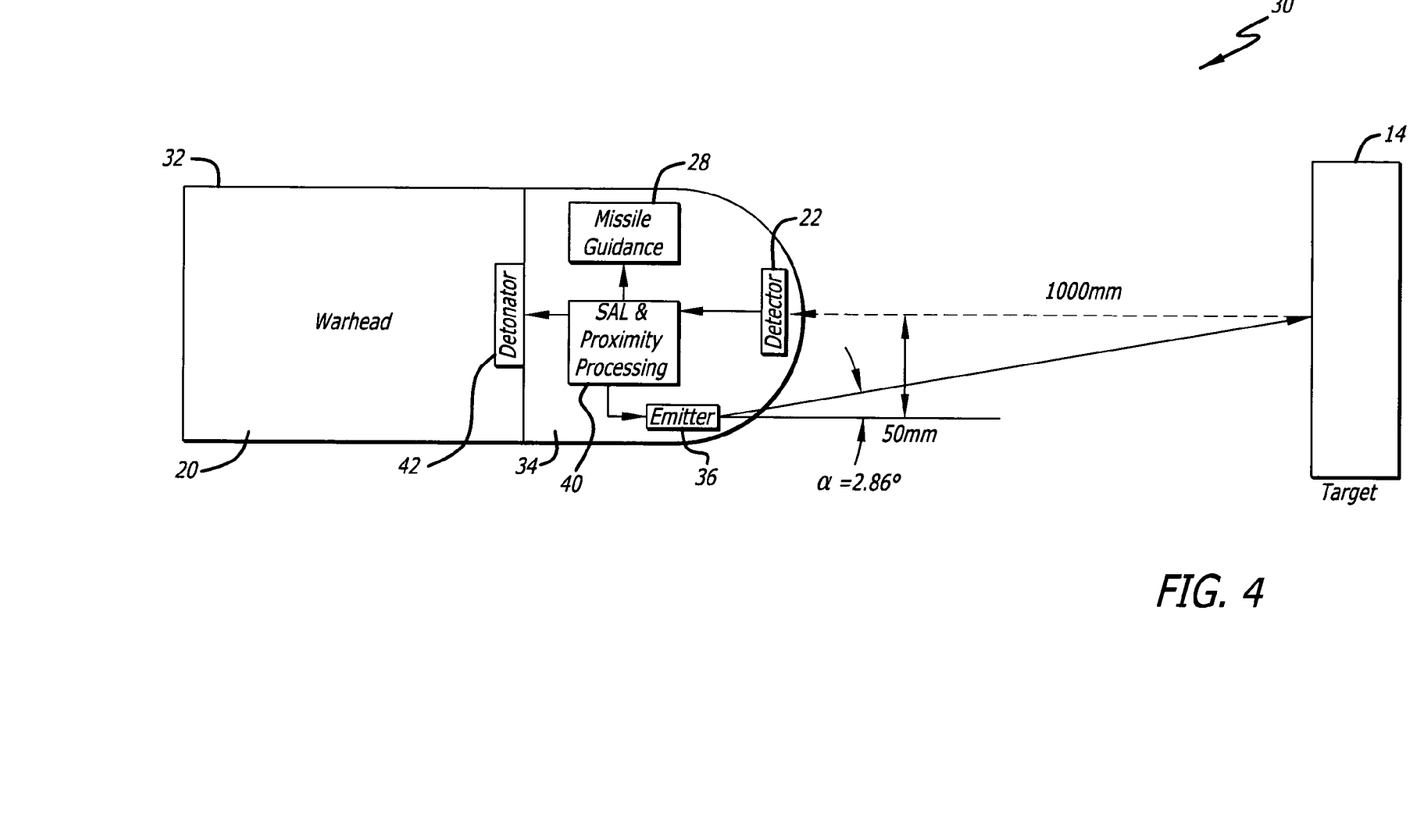
FIG. 4 is a diagram showing an illustrative numerical example for a proximity sensing SAL system designed in accordance with the present teachings.

FIG. 4 is a diagram showing an illustrative numerical example for a proximity sensing SAL system 30 designed in accordance with the present teachings. In this example, the emitter 36 is placed near the side of the missile, 50 mm from detector boresight to emitter centerline. The emitter 36 is angled at an angle α relative to boresight. For a desired detonation distance of 1000 mm with a received reflection angle of θ=0°, this would correspond to an emitter angle of $$\alpha = \tan^{-1}\left(\frac{50}{1000}\right) \sim 2.86°.$$

A SAL seeker typically has 0.01° angle resolution within 1° of boresight. For the example shown in FIG. 4, a 0.01° angle error of the detector 22 or emitter 36 would correspond to a distance error of only approximately 3.5 mm.

Figure 5:
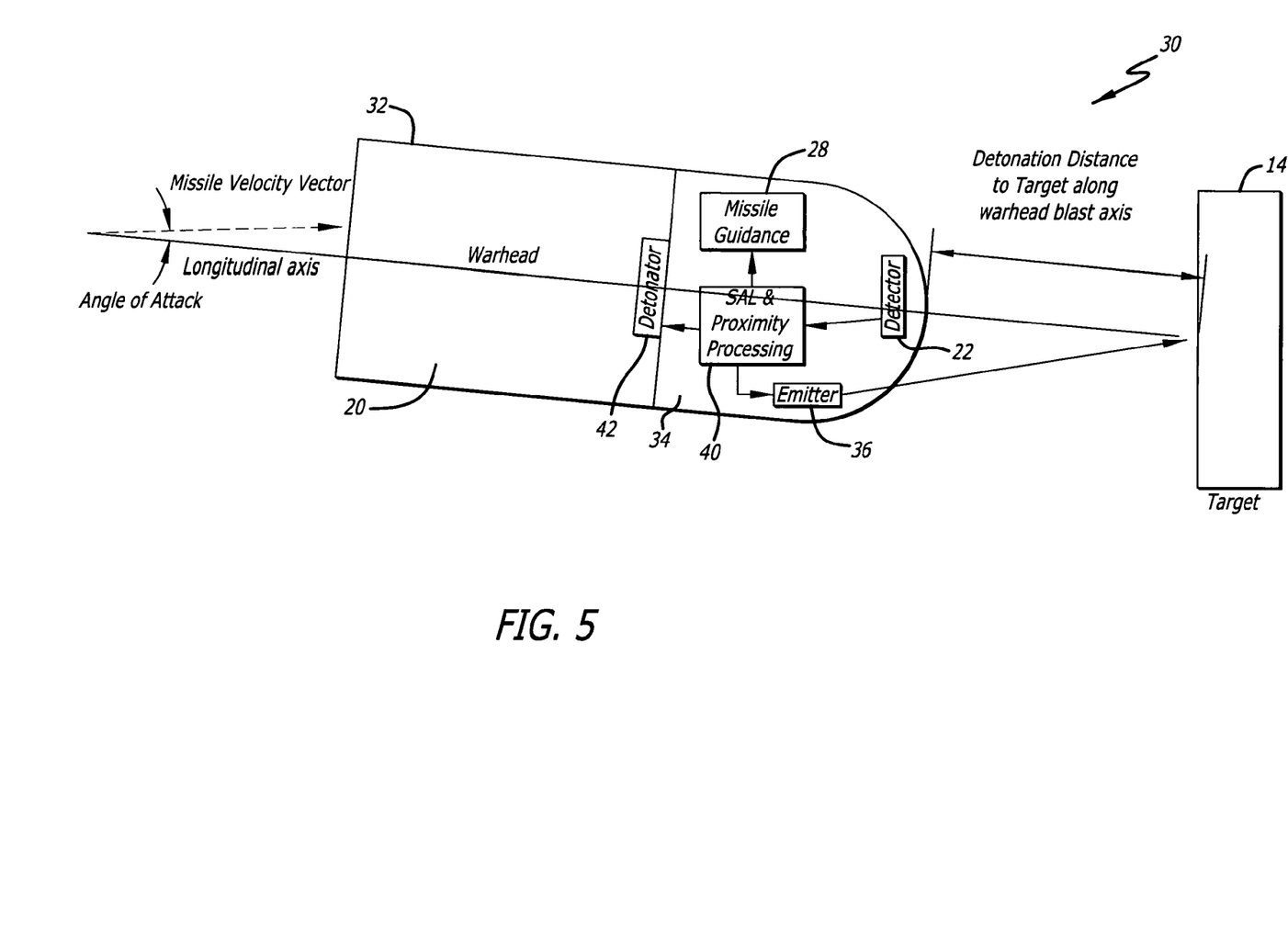
FIG. 5 is a diagram of a proximity sensing semi-active laser system designed in accordance with an illustrative embodiment of the present teachings, in which the angle of attack is not zero.

FIG. 5 is a diagram of a proximity sensing SAL system 30 designed in accordance with an illustrative embodiment of the present teachings in which the missile 32 is not approaching the target 14 at a heading that is perfectly perpendicular to the target 14, (i.e., the angle of attack is not zero). Angle of attack is the angle between the missile velocity vector and the missile longitudinal axis. A missile will typically have an angle of attack of 0° to 10° when it is within a few meters of the target. The warhead blast direction is typically in the same direction as the missile longitudinal axis. The desired detonation distance to the target is therefore measured along the longitudinal axis. Thus, the angle of attack does not cause a significant error in detonation distance within a typical range of angle of attack values.

Figure 6:
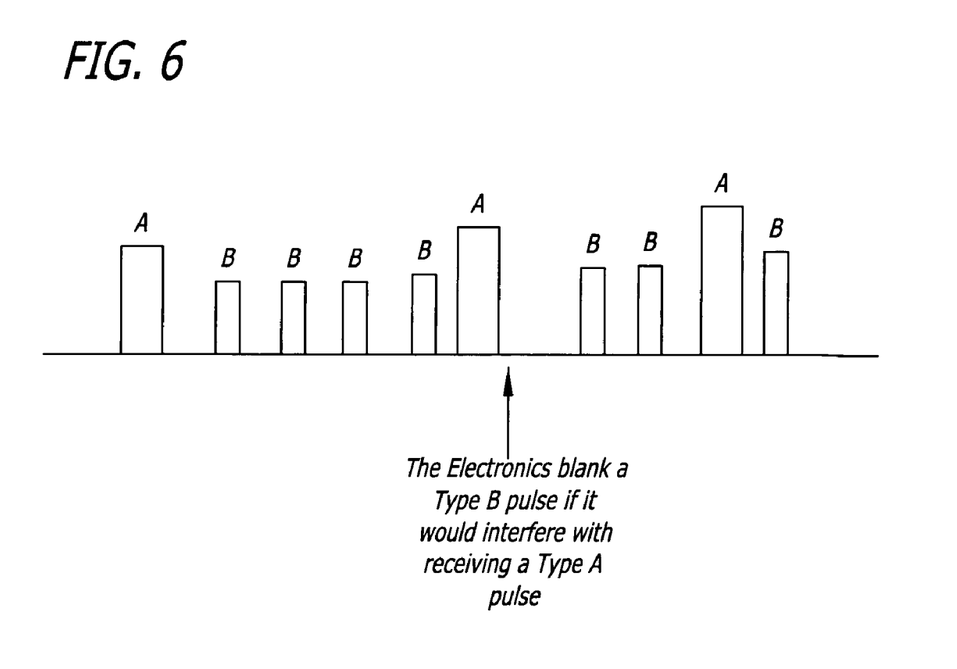
FIG. 6 is a plot of an illustrative signal received by the semi-active laser detector including both the reflected laser designator signal A and the reflected emitter signal B in accordance with the present teachings.

FIG. 6 is a plot of an illustrative signal received by the SAL detector 22, including both the reflected laser designator signal A and the reflected emitter signal B in accordance with the present teachings. In the illustrative embodiment, the SAL processor 40 is configured to control the emitter 36 to transmit an emitter signal such that the reflected emitter signal B can be distinguished from the reflected designator signal A. FIG. 6 shows one illustrative way this can be accomplished.

In this example, the external laser designator signal is a modulated pulse train comprised of widely spaced narrow pulses (labeled "A" in FIG. 6). The external designator pulses A have a modulated interval or pulse spacing set by a predetermined interval code so that the SAL processor 40 knows when to expect valid pulses. In the illustrative example, the emitter signal includes a series of pulses (labeled "B" in FIG. 6) that are timed to be between the Type A pulses.

In the illustrative example, the Type B pulses are transmitted at a constant repetition rate, but blanked when a Type B pulse would interfere with receiving a Type A pulse. Since the SAL processor 40 knows when to expect the Type A pulses, it can blank the Type B pulses (turn off the emitter 36) if there would be any interference. When measuring the reflection angle of the emitter signal (Type B pulses), the processor 40 can use interpolation to fill in for blanked pulses.

As shown in FIG. 6, the Type B pulses are spaced closer than the Type A pulses, with several Type B pulses occurring between two successive Type A pulses. The Type B pulses should have a faster pulse repetition rate in order to have greater distance resolution. As a numerical example, for a missile velocity of 300 m/s and a desired distance resolution of 0.01 m, the pulse repetition rate should be greater than 300/0.01=30 kHz.

Optionally, the spacing of the Type B pulses may be modulated in a random manner instead of at a constant repetition rate in order to provide an anti jamming capability, making it more difficult for an enemy to interfere with the signal. Since the SAL processor 40 generates the signal to be transmitted by the emitter 36, the processor 40 would know when to expect the reflected Type B pulses.

The emitter 36 should transmit at a wavelength that is within the bandwidth of the detector 22. The emitter signal may be at the same (or different) wavelength as the external designator signal. In the example of FIG. 6, the timing of the Type B pulses is controlled to not interfere with the Type A pulses so the processor 40 can distinguish between the two even if they are both transmitted at the same wavelength.

Figure 7:
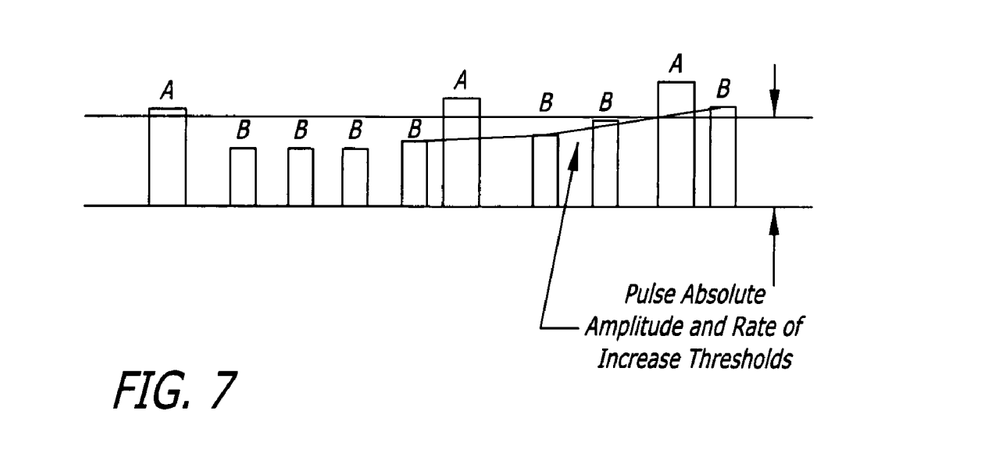
FIG. 7 is a plot of an illustrative signal received by the semi-active laser detector including both the reflected laser designator signal A and the reflected emitter signal B in accordance with the present teachings, as the missile closes in on the target.

FIG. 7 is a plot of an illustrative signal received by the SAL detector 22, including both the reflected laser designator signal A and the reflected emitter signal B in accordance with the present teachings, as the missile 32 gets close to the target 14. As shown in FIG. 7, the amplitude of both Type A and Type B received pulses increases rapidly when closing on the target 14. The SAL processor 40 measures both the angle and amplitude of the received Type B pulses. As discussed above, the angle of the emitter signal B can be used to determine the distance to the target. In addition, the rate of increase of the amplitude of the received emitter signal B may also be used to determine the distance to the target (either instead of or in addition to the angle measurement). In a preferred embodiment, both the angle and amplitude measurements are used to determine when to detonate the missile warhead 20. Specifically, the processor 40 is configured to trigger warhead initiation when both the measured angle and the rate of increase in amplitude cross predetermined thresholds. Using both measurements instead of just the angle measurement may increase accuracy in determining proximity.

Figure 8:
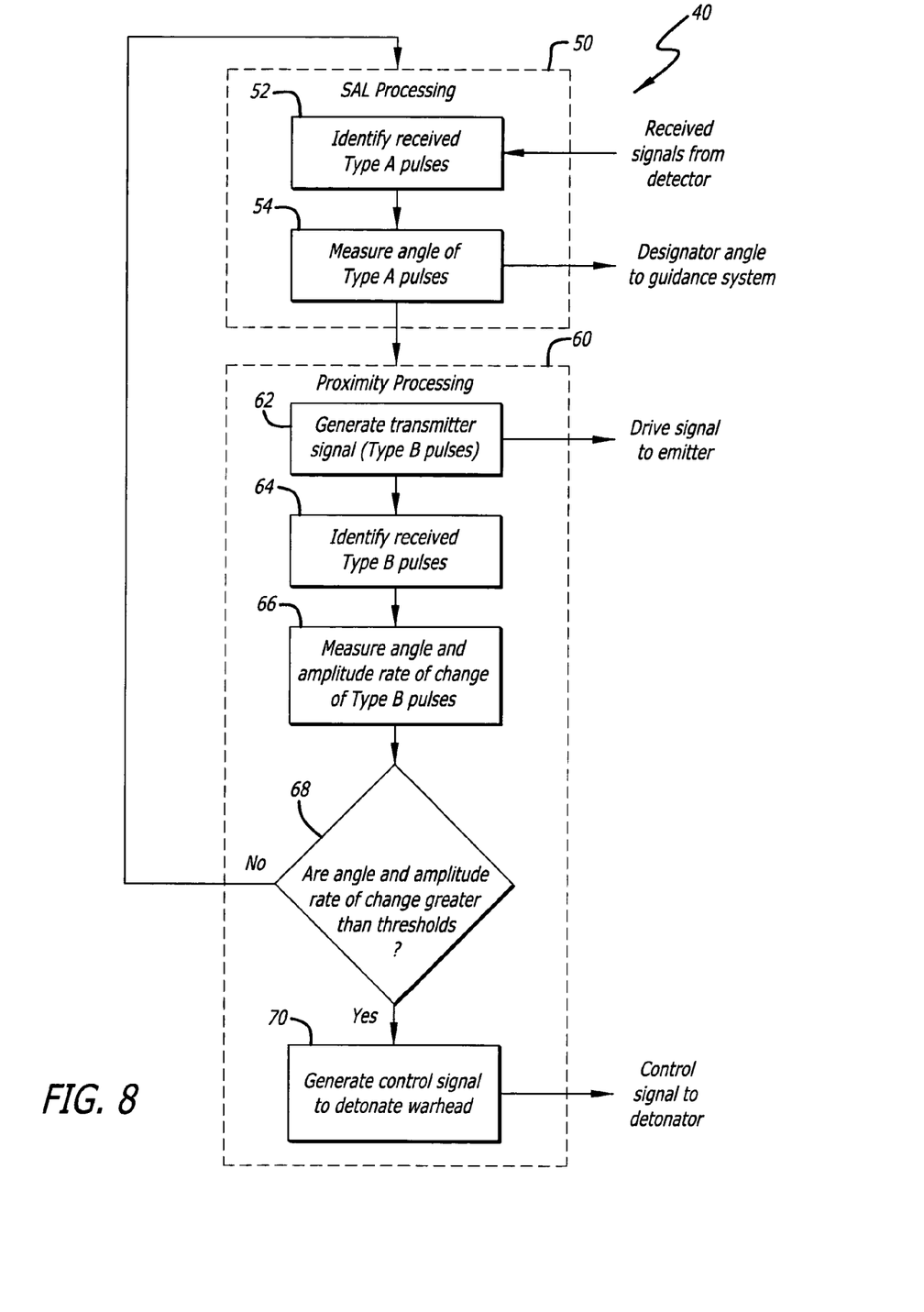
FIG. 8 is a simplified flow diagram of a semi-active laser and proximity sensing processing system designed in accordance with an illustrative embodiment of the present invention.

FIG. 8 is a simplified flow diagram of a SAL and proximity sensing processing system 40 designed in accordance with an illustrative embodiment of the present invention. The illustrative processing system 40 includes a SAL processing section 50 and a proximity processing section 60. As shown in FIG. 2, the processing system 40 receives the signals detected by the detector 22 and outputs signals to the guidance system 28, emitter 36, and detonator 42.

The SAL processing 50 includes the following steps: At Step 52, the processor 40 receives the signals from the detector 22 and identifies the reflected signal from the laser designator 12 (e.g., the Type A pulses shown in FIGS. 6-7). At Step 54, the processor 40 measures the angle of the received designator signal. This angle may be calculated from the received amplitude relationship between the multiple detector elements in the detector array 22. The measured angle is output to the guidance system 28 and used to guide the missile toward the laser designator spot on the target 14.

The missile 32 continues to track the Type A pulses from the designator 12 and guide the missiles 32 toward the target 14. At a predetermined time, the processor 40 begins proximity sensing by turning on the emitter 36. At Step 62, the processor 40 generates a drive signal for the emitter 36 such that the emitter 36 transmits a desired emitter signal (e.g., the Type B pulses shown in FIGS. 6-7). In the illustrative embodiment, as described above, the processor 40 blanks the Type B pulses if there would be any interference with the received Type A pulses.

The emitter 36 may be configured to transmit continuously throughout the missile flight or, in a preferred embodiment, the emitter 36 may be configured to begin transmitting at a predetermined time or point during the flight path when the missile 32 is closer to the target 14, in order to save power and to reduce the chances of enemy detection. The processor 40 should control the emitter output to insure that the power of the reflected signal received by the detector 22 is comparable to the energy from the reflected laser designator signal in order to stay within the dynamic range of the detector 22.

When the missile 32 gets close to the target 14, the detector 22 senses the presence of the Type B emitter pulses. At Step 64, the processor 40 identifies the Type B pulses, distinguishing them from the Type A pulses (and any other received signals or clutter). At Step 66, the processor 40 measures the angle of the received emitter signal, preferably using the same algorithm for measuring the angle of the received designator signal used in Step 54. Optionally, the processor 40 may also calculate the rate of change of the amplitude of the received Type B pulses.

At Step 68, the processor 40 compares the angle of the received emitter signal with a predetermined threshold corresponding to the desired detonation distance. In determining this threshold, pulse processing latency should be calibrated out of the system to allow for an accurate distance determination. Optionally, the processor 40 may also compare the rate of change of the amplitude of the received emitter signal with a predetermined threshold corresponding to the desired detonation distance.

If the measured angle and/or amplitude rate of change have not crossed their respective thresholds, then the processor 40 continues tracking the Type A and Type B pulses (returns to Step 52). If the measured angle and/or amplitude rate of change have crossed their respective thresholds, then at Step 70, the processor 40 generates a control signal to the detonator 42 to trigger warhead initiation. In the preferred embodiment, the processor 40 is configured to detonate the warhead when both the measured angle and the rate of increase in amplitude cross their respective thresholds.

The processing system 40 may be implemented using, for example, discrete logic circuits, FPGAs, ASICs, etc. Alternatively, the processing system 40 may be implemented in software executed by a microprocessor. Other implementations may also be used without departing from the scope of the present teachings.

Thus, the teachings of the present invention provide a novel method for determining proximity to a target object that uses the measured angle of a detected beam to measure distance. This approach can be relatively inexpensive for applications that use a SAL system. Proximity sensing capability can be added to a SAL system by adding just an emitter—which may be, for example, an inexpensive commercial off-the-shelf laser diode—and making a few programming additions to the SAL processing system.

Thus, the present invention has been described herein with reference to a particular embodiment for a particular application. Those having ordinary skill in the art and access to the present teachings will recognize additional modifications, applications and embodiments within the scope thereof. For example, while the invention has been described with reference to a proximity sensing fuze for a missile with semi-active laser guidance, the present teachings may also be used in other applications to determine the distance to an object.

It is therefore intended by the appended claims to cover any and all such applications, modifications and embodiments within the scope of the present invention.

Accordingly,

What is claimed is:

1. A proximity sensing system for use in a missile or munition for detecting proximity to a target, the system comprising:
   a detector comprising an array of elements and having an optical axis aligned with a boresite of the missile or munition;
   a laser emitter provided within the missile or munition to transmit a laser beam at a known angle relative to the optical axis from a position offset from the boresite to allow the transmitted laser beam to cross the optical axis of the detector; and
   a proximity processor configured to measure an angle of a reflection of the laser beam off the target based on relative amplitude levels of the reflections received across the elements of the detector,
   wherein the proximity processor is further configured to determine a distance to the target based on the measured angle for warhead detonation.

2. The proximity sensing system of claim 1 wherein the proximity processor is configured to generate an output signal when said measured angle of reflection crosses a threshold corresponding to a predetermined distance to the target to trigger warhead detonation.

3. The proximity sensing system of claim 2 wherein the output signal is coupled to a detonator.

4. The proximity sensing system of claim 1 wherein the proximity processor is configured to measure a rate of change of amplitude of the reflected beam for further use in determining the distance to the target.

5. The proximity sensing system of claim 4 wherein the proximity processor is further configured to generate an output signal when the measured angle and said rate of change of amplitude both cross respective thresholds corresponding to a predetermined distance.

6. The proximity sensing system of claim 1 wherein the detector is configured to receive a reflected laser designator signal for semi-active laser guidance, and
   wherein the reflected laser designation signal is transmitted from a source external to the missile or the munition and is distinguishable from the laser beam transmitted by the laser emitter.

7. The proximity sensing system of claim 6 further comprising circuitry to control the transmitted laser beam such that the reflected laser beam is distinguishable from the reflected laser designator signal.

8. The proximity sensing system of claim 7 wherein the transmitted laser beam includes a series of pulses.

9. The proximity sensing system of claim 8 wherein the proximity processing circuitry is configured to blank pulses in the transmitted laser beam if the pulses would interfere with the received laser designator signal.

10. The proximity sensing system of claim 8 wherein the circuitry to control the transmitted laser is configured to vary a spacing of the pulses in a random manner.

11. A system for detecting proximity to a target for use in a missile or munition, the system comprising:
    a detector comprising an array of elements and having an optical axis aligned with a boresite of the missile or munition;
    a laser emitter provided within the missile or munition to transmit a laser beam at a known angle relative to the optical axis from a position offset from the boresite to allow the transmitted laser beam to cross the optical axis of the detector; and
    a proximity processor configured to measure an angle of a reflected laser beam off a target based on relative amplitude levels of the reflections received across the elements of the detector and to determine a distance to the target based on the measured angle for warhead detonation,
    wherein the proximity processor is configured to distinguish a reflected laser designation signal transmitted from a source external to the missile or the munition from the laser beam transmitted by the laser emitter.

12. A semi-active laser seeker with a proximity sensing fuze comprising:
    a detector comprising an array of elements and having an optical axis aligned with a boresite of the proximity sensing fuze;
    a laser emitter provided within the proximity sensing fuze to transmit a laser beam at a known angle relative to the optical axis from a position offset from the boresite to allow the transmitted laser beam to cross the optical axis of the detector;
    a processor configured to measure an angle of a reflection of the laser beam off a target based on relative amplitude levels of the reflections received across the elements of the detector,
    wherein the detector is configured to receive both the reflected laser beam and a reflected laser designator signal transmitted from a source external to the proximity sensing fuze,
    wherein the processor is further configured to determine a distance to the target based on the measured angle for warhead detonation, and
    wherein the processor is further configured to use the reflected laser designator signal for guidance control to the target.

13. The semi-active laser seeker of claim 12 wherein the processor is further configured to drive the laser emitter with a modulation to allow the processor to distinguish the reflected laser beam from the reflected designator signal.

14. A missile comprising:
    a warhead;
    a detector comprising an array of elements and having an optical axis aligned with a boresite of the missile;
    a laser emitter provided within the missile to transmit a laser beam at a known angle relative to the optical axis from a position offset from the boresite to allow the transmitted laser beam to cross the optical axis of the detector; and
    a processor configured to measure an angle of a reflection of the laser beam off a target based on relative amplitude levels of the reflections received across the elements of the detector,
    wherein the processor is further configured to determine a distance to the target based on the measured angle for detonation of the warhead, wherein the detector is configured to receive both the reflected laser beam and a reflected laser designator signal transmitted from a source external to the missile, wherein the processor is further configured to use the reflected laser designator signal for guidance control to the target.

15. A method for detecting proximity to a target performed by a missile or munition, the method comprising:

transmitting a laser beam from within the missile or munition at a known angle relative to an optical axis of a detector from a position offset from a boresite of the missile or munition to allow the transmitted laser beam to cross the optical axis of the detector;

detecting said reflected emitter beam with the detector comprising an array of elements such that the optical axis is aligned with the boresite of the missile or munition; and measuring an angle of a reflection of the laser beam off a target based on relative amplitude levels of the reflections received across the elements of the detector to determine a distance to the target.

* * * * *